United States Patent
Nicolas (10) Patent No.: US 12,470,852 B2
(45) Date of Patent: Nov. 11, 2025

(54) ASYNCHRONOUS LASER PULSE DETECTION AND PASSIVE IMAGING

(71) Applicant: COMMISSARIAT A L'ENERGIE ATOMIQUE ET AUX ENERGIES ALTERNATIVES, Paris (FR)

(72) Inventor: Jean-Alain Nicolas, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 18/545,679

(22) Filed: Dec. 19, 2023

(65) Prior Publication Data
US 2024/0205568 A1    Jun. 20, 2024

(30) Foreign Application Priority Data
Dec. 20, 2022    (FR) ...................... 22 13919

(51) Int. Cl.
*H04N 25/78* (2023.01)
*H04N 23/56* (2023.01)
(Continued)

(52) U.S. Cl.
CPC ............. *H04N 25/78* (2023.01); *H04N 23/56* (2023.01); *H04N 25/20* (2023.01); *H04N 25/75* (2023.01);
(Continued)

(58) Field of Classification Search
CPC ...... H04N 25/75; H04N 25/772; H04N 25/78; H04N 25/77
See application file for complete search history.

(56) References Cited

U.S. PATENT DOCUMENTS

| | | | | |
|---|---|---|---|---|
| 5,892,540 A | * | 4/1999 | Kozlowski | H04N 25/78 348/E5.079 |
| 6,194,703 B1 | * | 2/2001 | Kuderer | H04N 25/772 250/214 R |

(Continued)

FOREIGN PATENT DOCUMENTS

| | | | | |
|---|---|---|---|---|
| CN | 111412997 A | * | 7/2020 | G01J 5/24 |
| FR | 2 915 833 A1 | | 11/2008 | |

(Continued)

OTHER PUBLICATIONS

European Search Opinion for EP 23218367.3 (Apr. 22, 2024) (Year: 2024).*

(Continued)

*Primary Examiner* — David N Werner
(74) *Attorney, Agent, or Firm* — Oblon, McClelland, Maier & Neustadt, L.L.P.

(57) ABSTRACT

An imaging device including at least one detection element formed of a photodetector associated with and connected to a circuit for reading signals generated by the photodetector. The circuit is provided with an integration stage equipped with an integration capacitor for integrating charges coming from the photodetector, a pulse detection stage for detecting current pulses produced by the photodetector, and a bias stage. The circuit is further provided with an intermediate stage arranged between the bias stage and between respectively the integration stage and the pulse detection stage, the intermediate stage being provided with transistors forming a current mirror and producing on an input branch of the integration stage an image current of a given current delivered by the direct injection transistor, the intermediate stage being configured to convert the given current into a potential on an input node of the pulse detection stage.

12 Claims, 4 Drawing Sheets

(51) Int. Cl.
*H04N 25/20* (2023.01)
*H04N 25/75* (2023.01)
*H04N 25/76* (2023.01)
*H04N 25/77* (2023.01)
*H04N 25/772* (2023.01)

(52) U.S. Cl.
CPC ............ *H04N 25/76* (2023.01); *H04N 25/77* (2023.01); *H04N 25/772* (2023.01)

(56) References Cited

U.S. PATENT DOCUMENTS

| | | | | |
|---|---|---|---|---|
| 6,836,171 | B1* | 12/2004 | Weedon | G06G 7/186 |
| | | | | 327/344 |
| 9,215,386 | B2* | 12/2015 | Elkind | F41G 7/008 |
| 9,871,066 | B2* | 1/2018 | Lin | H04N 25/77 |
| 11,418,734 | B1* | 8/2022 | Wang | H04N 25/78 |
| 2004/0169753 | A1* | 9/2004 | Gulbransen | G01J 1/46 |
| | | | | 348/E3.019 |
| 2008/0211940 | A1* | 9/2008 | Hynecek | H04N 25/621 |
| | | | | 348/250 |
| 2014/0252212 | A1* | 9/2014 | Xu | G01J 1/4204 |
| | | | | 250/214.1 |
| 2014/0340154 | A1* | 11/2014 | Lin | H04N 25/77 |
| | | | | 330/288 |
| 2015/0281612 | A1* | 10/2015 | Lund | H04N 25/76 |
| | | | | 257/292 |
| 2016/0295146 | A1 | 10/2016 | Lin et al. | |
| 2017/0207262 | A1 | 7/2017 | Lin et al. | |
| 2019/0113605 | A1 | 4/2019 | Liobe et al. | |
| 2023/0188866 | A1* | 6/2023 | Zhang | H04N 25/709 |
| | | | | 348/207.99 |

FOREIGN PATENT DOCUMENTS

| | | | | |
|---|---|---|---|---|
| JP | 2009060424 A | * | 3/2009 | ....... H01L 27/14609 |
| WO | WO-2017051154 A1 | * | 3/2017 | ............. H04N 5/361 |
| WO | WO-2019239128 A1 | * | 12/2019 | ............. H04N 25/40 |

OTHER PUBLICATIONS

European Search Report for EP 23218367.3 (Apr. 22, 2024) (Year: 2024).*

French Preliminary Search Report Issued May 22, 2023 in French Application 22 13919 filed on Dec. 20, 2022 (with English Translation of Categories of Cited Documents), 2 pages.

* cited by examiner

ASYNCHRONOUS LASER PULSE DETECTION AND PASSIVE IMAGING

TECHNICAL FIELD

The present application relates to the field of image sensors making it possible, further to performing an image capture of a scene, to implement a simultaneous detection of light pulses.

PRIOR ART

The document U.S. Pat. No. 9,215,386B2 presents a multi-function detector that makes it possible to integrate a plurality of different operating modes and in particular has a function for detecting the arrival of light pulses coming from a laser shot while simultaneously performing a conventional acquisition of images of a scene. Here, the pulse detection function is ensured by a pulse detection stage connected to the source of a bias transistor of the photodiode and commonly called "direct injection" transistor. As shown in FIG. 4 of this patent document during the detection of pulses concomitant with the conventional acquisition of the image, the bias is carried out by a Buffered Direct Injection (BDI) type bias structure with an amplifier coupled to the direct injection transistor.

Another stage, dedicated to the passive acquisition of images, is provided with current integrator means in the form of an amplifier and of an integration capacitor that recovers the current to be integrated at the drain of the direct injection transistor. Such a device requires an accurate adjustment of the amplifier of the passive imaging stage and may have a tendency to attenuate the pulse detection signal.

The BDI bias structure is chosen to provide a more stable bias of the photodiode in spite of the variations of flow and therefore of current that pass through the direct injection transistor. This better stabilisation improves the performances particularly in linearity. This better stabilisation is provided by way of the amplifier in the bias structure that makes it possible to reduce the input impedance of the structure. However, a reduction of the input impedance also results in a reduction of the sensitivity to pulses.

Document U.S. Pat. No. 9,871,066B2 for its part proposes an imaging device with two different paths, a HF ("High-Frequency") path and a LF ("Low-Frequency") path, respectively to perform an asynchronous detection of laser light pulses and the simultaneous constitution of an image.

The signal of the "high-frequency" path is sampled on the gate of the so-called "direct injection" transistor of a bias stage of the photodiode. A "low-frequency" signal here is sampled on the drain of this same transistor.

With such a device, maintaining a high bandwidth may have the effect of inducing a high consumption.

For this device, a BDI bias is also implemented with the use of feedback by means of an amplifier. The bandwidth of the loop is determined by the detection band that is desired for detecting pulses. This may lead to increasing the consumption of the bias structure.

It is sought to implement a new image sensor for concomitantly carrying out a new image capture and a simultaneous detection of light pulses and that is improved, in particular in relation to the abovementioned drawbacks.

Preferably, it is sought to implement a less energy-consuming and the smallest possible sensor.

DISCLOSURE OF THE INVENTION

An object of the invention is therefore to produce an imaging device for the passive image capture by integrating a current generated by a photodiode illuminated by a scene, while detecting the arrival of very short laser pulses in relation to the frame time generating as output of the photodiode a spike or a current pulse of very short duration, this preferably by minimising the number of components in order to be compatible with an integration in a pixel of reduced size and limiting the consumption.

According to an embodiment, the present invention relates to an imaging device including at least one detection element formed of a photodetector associated with and connected to a circuit for reading signals generated by the photodetector, the readout circuit being provided with:

an integration stage equipped with an integration capacitor for integrating charges coming from the photodetector, a pulse detection stage, for detecting current pulses produced by the photodetector following the receipt of light pulses, a bias stage of the photodetector and equipped with a direct injection transistor coupled to the photodetector, the readout circuit further being provided with a so-called "intermediate" stage arranged on the one hand between the bias stage and between on the other hand respectively the integration stage and the pulse detection stage, the intermediate stage being provided with transistors forming a current mirror provided with a branch coupled to a drain of the direct injection transistor and producing on an input branch of the integration stage an image current $I_B$ of a given current $I_O$ delivered by the direct injection transistor, the intermediate stage being configured to convert said given current $I_O$ into a potential $V_A$ on an input node of said pulse detection stage, said input node being arranged on a gate electrode or at a source electrode of a transistor of said intermediate stage.

Typically, the input node is connected to a drain electrode of the direct injection transistor and to the gate of a transistor of said "intermediate" stage.

The current mirror favours a separation between the integration stage and the pulse integration stage, while limiting the consumption and the overall size and by maintaining a high bandwidth.

Advantageously, the photodetector is a photodiode, in particular a photodiode that operates in the infrared range and converts infrared radiation into an electric current.

According to a possible implementation, the input node is connected to an electrode, in particular a drain electrode of the direct injection transistor and to the gate of a transistor of said "intermediate" stage.

According to a possible embodiment, the current mirror may be formed of:

a first transistor coupled or connected to said electrode of the direct injection transistor, in particular to the drain electrode of said direct injection transistor, and, a second transistor having a gate connected to the gate of the first transistor, the second transistor being coupled or connected to the input branch of the integration stage.

According to a particular implementation, the input node of the pulse detection stage is connected to the gate of a third transistor mounted in cascode with said second transistor, the third transistor being directly connected to said input branch of the integration stage. Such a transistor makes it possible to amplify the signals detected. The assembly thus adapts particularly to the detection of low amplitude pulses.

Alternatively, the input node of the pulse detection stage is connected to the gate of the second transistor and of the first transistor, the first transistor having its gate and its drain connected together, the second transistor being directly coupled or connected to the input branch of the integration stage.

The implementation of a simple current mirror with two transistors or with two transistors and a cascode transistor makes it possible to limit the parasitic capacitances.

Advantageously, the pulse detection stage may be provided with:
- a voltage pulse detection block, configured to detect a voltage threshold and emit a signal indicating the exceedance of this threshold when the voltage signal is exceeded;
- a filtering block upstream of the voltage pulse detection block.

According to a possible implementation, the bias stage may be a buffered direct injection bias stage and comprises an amplifier the output of which is connected to the gate of the direct injection transistor.

Such a bias mode is particularly adapted to the detection of low intensity light pulses.

BRIEF DESCRIPTION OF THE DRAWINGS

The present invention will be better understood in light of the following description and the appended drawings wherein.

Identical, similar or equivalent parts of the various figures bear the same numerical references so as to facilitate the transition from one figure to the other.

The various parts shown in the figures are not necessarily according to a uniform scale, in order to make the figures more readable.

DETAILED DISCLOSURE OF PARTICULAR EMBODIMENTS

Figure 1:
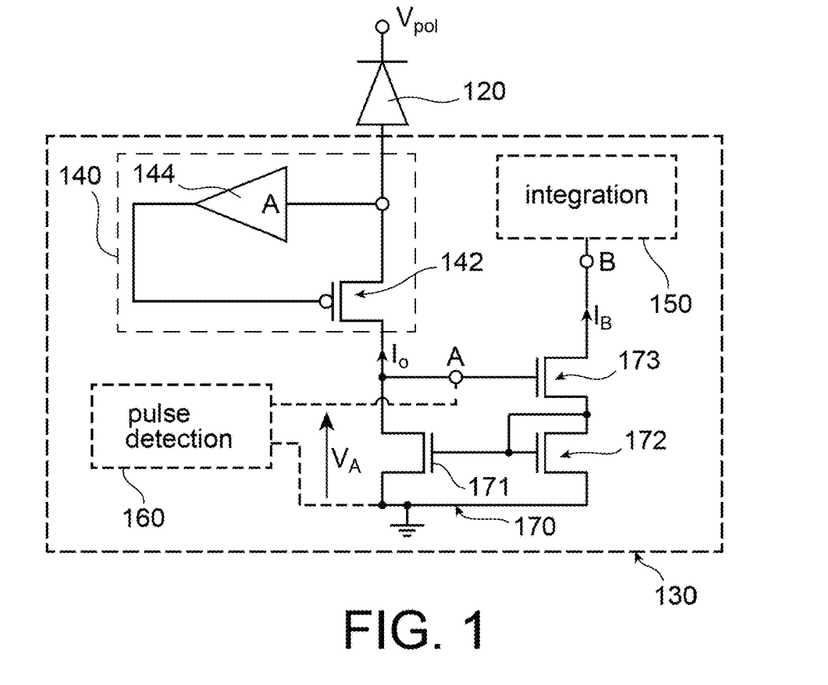
FIG. 1 illustrates, in an infrared imager, an example of a readout pixel with a current integration stage and a stage for detecting pulses separated from and coupled to a current mirror.

Reference is now made to FIG. 1 giving a particular example of embodiment of a readout circuit 130 of an image sensor or imager such as implemented according to one embodiment of the present invention.

The imager is, in this example, an infrared imager.

The readout circuit 130, also called "readout pixel" or "pixel", is connected to a photodetector such as a photodiode 120. The photodiode 120 delivers to the readout circuit a current representative of an observed scene and converts a light radiation, in this example an IR radiation, into an electric current. The readout circuit 130 associated with the photodiode 120 form a detection element. The imager generally counts a plurality of detection elements typically arranged in an array of one or more line(s) (also called horizontal row(s) and one or more columns) (also called vertical row(s)).

To bias the photodiode 120, here a bias potential Vpol is applied to one of its terminals, whereas the other terminal is coupled to the readout circuit 130.

The readout circuit 130 in the form of a circuit with transistors is equipped with a stage 140 for biasing the photodiode 120. This bias stage 140 comprises a bias or also called "direct injection" transistor 142 connected to the photodiode 120.

In the particular example of embodiment illustrated in FIG. 1, the bias stage 140 is a buffered direct injection (BDI) bias stage of the photodiode 120 and is thus further equipped with an amplifier 144 of gain A. An input of the amplifier 144 here is connected to an electrode of the transistor 142 of the direct injection transistor, in particular to its source. This input is also connected to the photodiode 120 whereas the output of this amplifier 144 governs the gate voltage of the direct injection transistor 142.

A feedback is thus established on a signal that is used to bias the photodiode 120. The direct injection transistor 142, here mounted in cascode, makes it possible to maintain a fixed bias on the photodiode 120 during a phase of integrating the photodiode 120 current.

Biasing the photodiode 120 by means of a BDI assembly makes it possible to reduce the input impedance seen by the photodiode 120 and thus increase the bandwidth. Such an assembly is conducive to detecting current spikes resulting from light pulses with straight fronts and a short duration of the spikes.

The photodiode 120 receives a constant light flow coming from the observed scene and consequently generates a constant current that, when it is integrated during a certain integration time, gives information relating to the average illumination received by the pixel. For example, for photodiode 120 currents in the order of ten or so picoamperes, the integration time may be in the order of ten or so milliseconds.

To carry out a passive acquisition of images of a scene, the readout circuit 130 is thus provided with a first readout stage 150 also called "integration" stage 150 and typically provided with at least one integration capacitor (not shown in this figure). The integration capacitor may be for example provided for storing in the order of one or more hundreds of thousands of electrons.

The integration stage 150 is configured to integrate on the integration capacitor (not shown) the charges delivered by the photodiode 120 in order to obtain at the end of the frame voltage information reflecting the total light flow received by the photodiode 120 during an integration duration.

The integration stage 150 is advantageously provided with a means for resetting the integration capacitor, for example in the form of a reset transistor the gate of which is controlled by a reset signal and that may make it possible to empty the charges stored by the integration capacitor. Apart from the integration capacitor, the integration stage 150 may, in certain embodiments, also be provided with a follower transistor and with a row selection transistor. According to an optional implementation, the integration stage 150 may also be provided with a storage block downstream of the integration capacitor and that is used to duplicate a voltage value at the terminals of the integration capacitor once the integration period has lapsed. The integration stage 150 may then be provided with a storage capacitor and advantageously a reset element for making it possible to empty the charges stored by the storage capacitor and reset to zero the voltage value stored at the terminals of this capacitor.

The integration stage 150 thus receives a current $I_B$ on an input branch B. This current IB depends on a current from the photodiode 120. Here, the device has the specific feature of having its integration stage 150 that is not directly connected to the bias stage 140 and in particular to the direct injection transistor 142. Thus, the input current $I_B$ of the integration stage 150 is sampled on a circuit branch B that is not directly connected to one of the electrodes or of the terminals of the direct injection transistor 142.

Apart from the passive capture of images, the imager here is configured to detect on at least one or more pixels, the arrival of light pulses.

Thus, a light source (not shown), in particular of the laser type and associated with the image sensor, may be provided for generating a directional light beam that illuminates a precise area of a scene observed by the sensor. The laser source is possibly integrated into the imager or may be separated from and independent of this imager. By way of example, the photodetector used may be a photodiode of the Short Wave Infra Red (SWIR) type for detecting laser pulses with wavelengths for example in the order of 1.5 μm.

The light beam emitted is typically pulsed so that the imager is brought to detect light pulses that are emitted at a frequency that may be constant or fixed or possibly variable according to a given sequence and making it possible to constitute a coding. Typically, the duration of the light pulses is very short, for example in the order of several tens or so of nanoseconds, and these pulses are translated as output of the photodiode 120 by current pulses in the order of several tens or so of nanoamperes. The shape and the duration of these current pulses may vary significantly depending particularly on the media passed through by the laser radiation. Typically this is translated by several hundreds or thousands of electrons collected at the photodiode 120.

Insofar as a quantity of charges produced by the photodiode 120 following the arrival of a laser pulse is generally very low in relation to a quantity of charges obtained during the acquisition of passive images of a scene, the detection of the arrival of pulses is not performed directly on the integration capacitor of the integration stage 150. Here, a specific detection stage is provided for detecting the arrival of laser pulses and that is therefore different from the integration stage 150. The integration stage 150 samples on its input branch B a signal, whereas the detection stage 160 samples at an input node A that is not located on the branch B and is not directly connected to this branch B, a signal being able to be processed independently in order to obtain two simultaneous pieces of passive imaging information, and on the other hand indication of the arrival or not of laser pulses.

The readout circuit 130 is thus also provided with a second readout stage also called pulse detection stage 160, dedicated to the detection of light pulses. Here, the pulse detection stage 160 is directly connected to the bias stage 140 and to an electrode of the direct injection transistor 142, in this example to its drain.

Due to the significant differences in intensities and in respective variation durations of an asynchronous signal coming from the laser source and of a quasi-constant signal coming from the scene, rather than use the integration capacitor for detecting pulses, here a resistive impedance is used in order to perform a current/voltage conversion as input of the pulse detection stage 160. As the maximum current intensity delivered by the photodiode 120 is low, this resistive impedance is preferably provided with a very high resistance value and typically of at least several hundreds of kOhm.

The input signal of the pulse detection stage 160 varies here depending on a potential $V_A$ taken at a node A directly connected to the direct injection transistor 142 and that here is the image of the drain current of this transistor 142.

The pulse detection stage 160 typically comprises a block for detecting pulses 166, in particular voltage pulses. This pulse detection block 166 may be configured to detect whether or not a voltage exceeds a given threshold and to generate following this exceedance an exceedance indicator signal. The pulse detection block 166 may be equipped for example with a comparator and configured to produce an indicator binary signal, depending on its high or low state of the detection or not of a threshold exceedance.

The pulse detection stage 160 is typically provided upstream of the pulse detection block 166 of a filtering block 162, typically a high-pass filtering block or a band-pass filtering block.

The photodiode current generated by observing a scene varies little throughout the duration of a frame but may vary significantly from one frame to another consequently making the potential $V_A$ vary at the node A as input of the pulse detection stage 160. These variations of the potential $V_A$ at the node A that are not due to the arrival of a current pulse following the detection of a laser pulse are therefore filtered by the filtering block 162.

Figure 2:
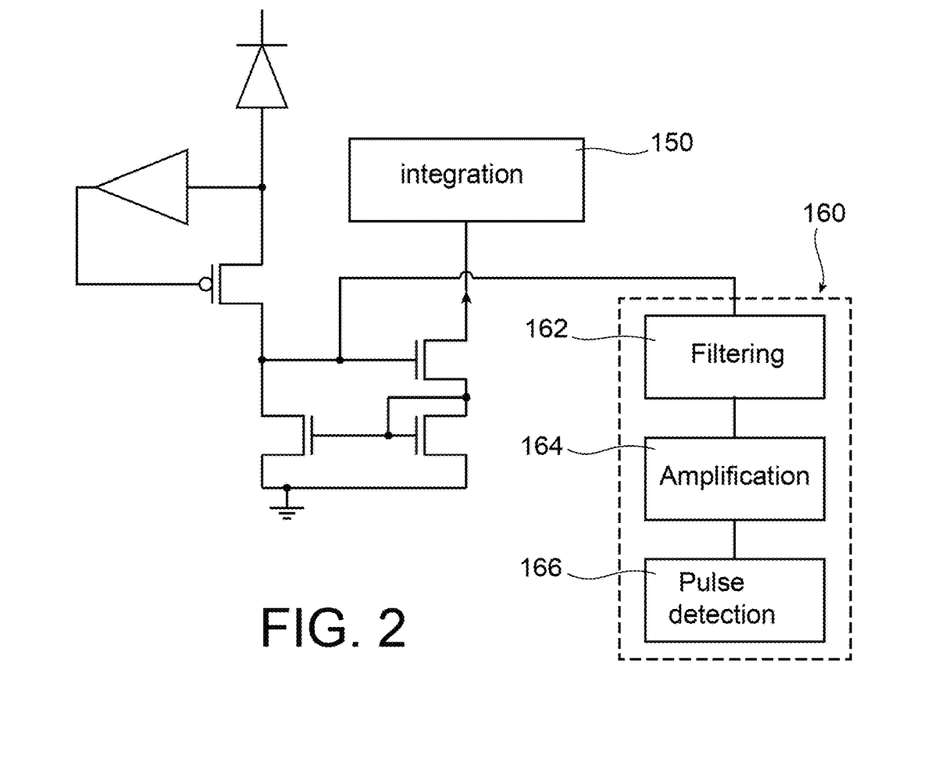
FIG. 2 illustrates functional blocks of a pulse detection stage.

A particular embodiment illustrated in FIG. 2 provides for the insertion of an amplifier 164 between a high-pass or band-pass, filtering block 162, and a pulse detection block 166.

To make it possible to favour a separation between the integration stage 150 and the pulse detection stage 160, while limiting the consumption and the overall size and by maintaining a high bandwidth, the readout circuit 130 here has the specific feature of being provided with a stage 170 forming a current mirror.

Here, the current mirror is provided with a branch connected to the direct injection transistor 142 for sampling (or transmitting) a given current $I_O$ coming from (or going to) this direct injection transistor 142 and image of the current of the photodiode 120. The current mirror 170 is provided with a second branch producing an output current $I_B$ copy, or image, to the nearest multiplier factor K (with K that may possibly be other than 1), of the current $I_O$.

Depending on the ratio of the respective sizes of the transistors, 171, 172 of the current mirror, the output current $I_B$ may be provided identical to the current $I_O$ and to that in the photodiode 120 or may be greater than the photodiode 120 current in the current mirror. In this latter case, where the ratio of the sizes of the transistors, 171, 172 is provided for producing a gain in current, the device is particularly adapted for observing scenes generating a low light flow.

The pulse detection stage 160 is connected to the first branch of the current mirror and here directly to the direct injection transistor 142. The integrator stage 150 for its part is connected to the second branch of the current mirror.

Here, the current mirror is formed of a first transistor 171, in particular an NMOS, the source of which here is connected to the drain of the direct injection transistor 142 as well as to the input of the pulse detection stage 160. The current mirror includes a second transistor 172, in particular of the NMOS type, the gate and the source of which are connected together and to the gate of the first transistor 171.

In the particular example of embodiment of FIG. 1, the second branch 172 of the mirror 170 comprises or is associated here with a transistor 173 mounted in cascode and to which the integration stage 150 is directly connected. The pulse detection stage 160 for its part is connected to the gate of this transistor 173, which makes it possible to have a high resistive impedance as input of the pulse detection stage 160, and thus stronger voltage variations during the arrival of laser pulses.

Figure 3:
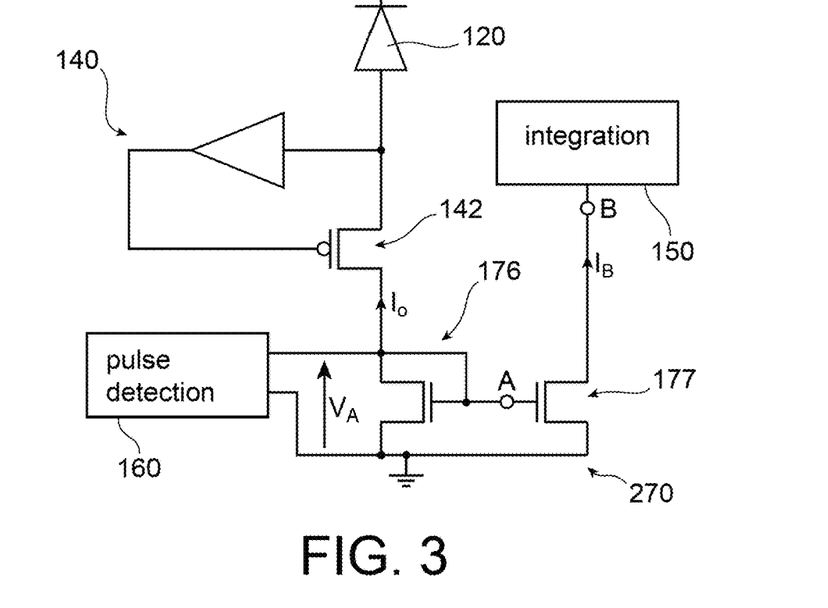
FIG. 3 illustrates one embodiment for which the integration stage is directly coupled to a current mirror including a reduced number of transistors.

An alternative embodiment is given in FIG. 3, more compact that the preceding, provides for replacing the stage 170 with a simple current mirror 170' the first transistor 176 of which directly connected to the direct injection transistor 142, for example NMOS, has its gate and its source that are connected together and to the input node A of the pulse detection stage 160.

The second branch of the mirror here is only formed of a single transistor 177, for example NMOS, the gate of which is connected to the node A and the source of which is directly connected to the input branch B of the integration stage 150. This integration stage 150 thus samples a current $I_B$ at the source of the transistor 177 that is the image at a nearest coefficient, not zero possibly equal to 1, of the drain current IO of the direct injection transistor 142, itself image or equal to the photodiode current 120.

The gain obtained for the current/voltage conversion here is lower than in the example of embodiment described above. The configuration described above in connection with FIG. 3 is thus better for detecting lower intensity laser pulses, for example when the laser pulse source is moved away or when the medium passed through by the laser is more attenuating.

Figure 4:
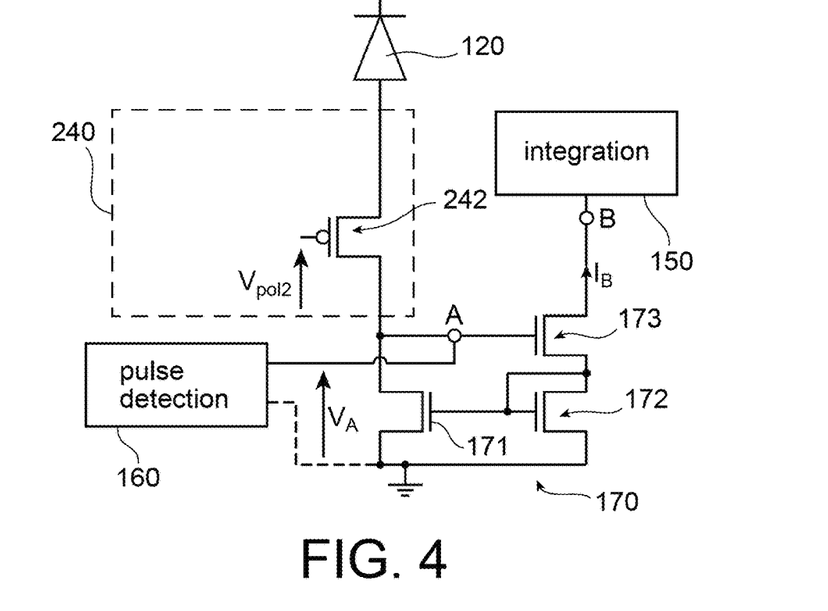
FIG. 4 illustrates another example of embodiment for which the buffered direct injection (BDI) type bias stage is replaced with a direct injection type bias stage.

Another alternative embodiment illustrated in FIG. 4 this time provides for replacing the BDI type bias stage with a stage 240 here formed only of a direct injection transistor 245 the arrangement of which differs from that described above by that of its gate set at a bias potential Vpol2.

Such a variant without amplifier makes it possible to reduce the consumption and the occupied surface in the pixel, but proves to be less efficient for detecting laser pulses of very short duration.

Figure 5:
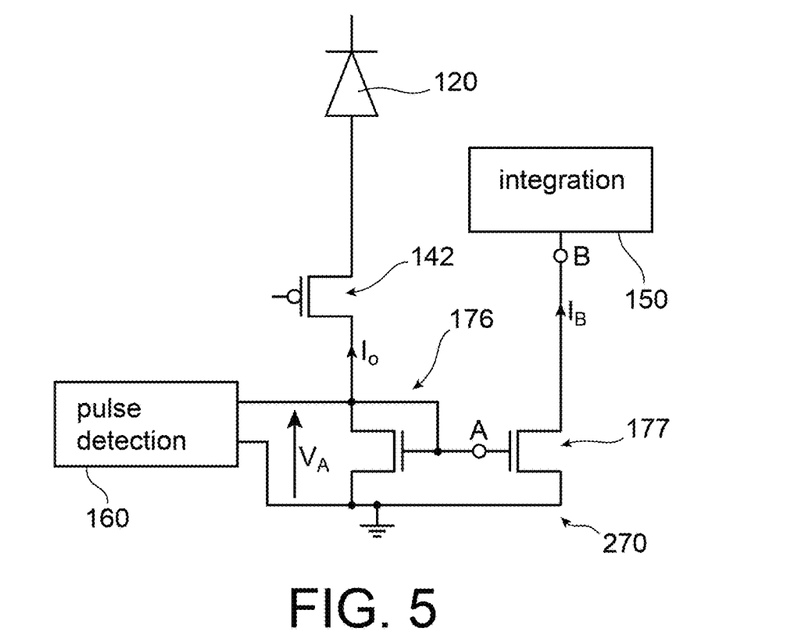
FIG. 5 illustrates an alternative embodiment of the device of FIG. 3 for which the bias stage is of the direct injection (DI) type.

Such a bias mode, also adapts, as illustrated in FIG. 5, to a mirror structure such as described above and formed only of two transistors 176, 177.

In the example of embodiments illustrated, the photodiode 120 is typically of the P-on-N type and inversely biased. In this case, the direct injection transistor 142 of the PMOS type is typically provided.

A device as described above also adapts to a photodiode 120' of the N-on-P type.

Here, the photodiode 120' has its cathode terminal at a bias potential that may be a low bias potential, for example at the ground GND whereas its anode terminal is connected to the readout circuit.

Figure 6:
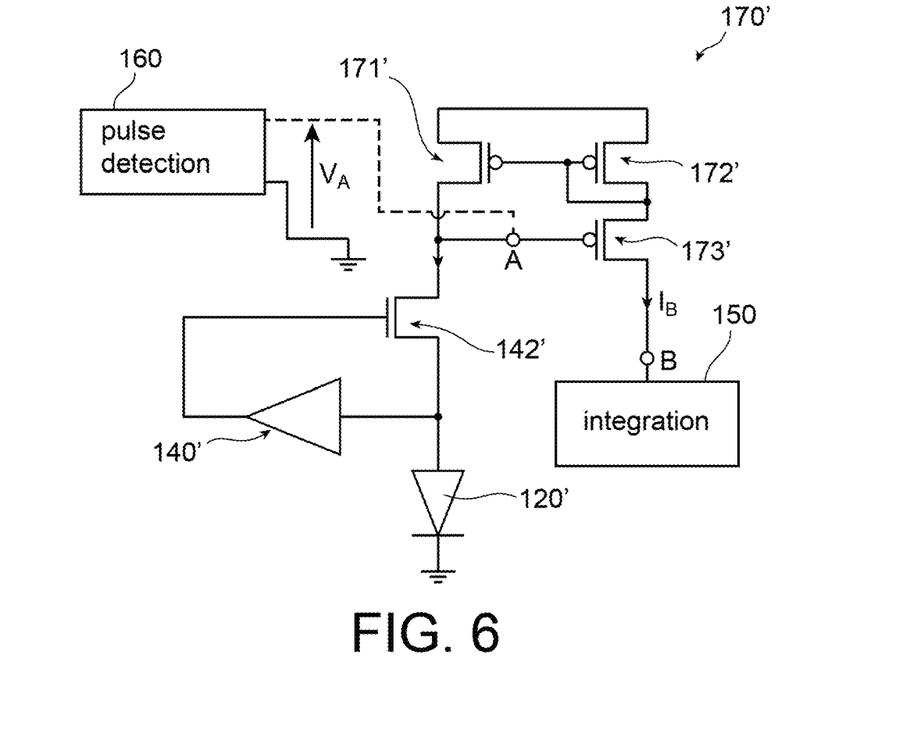
FIG. 6 illustrates an alternative embodiment of the device of FIG. 1 for which the photodiode is of the N-on-P type.

Thus, in the example of embodiment illustrated in FIG. 6, the bias stage 140' is provided with a direct injection transistor 142' of the PMOS type.

Likewise, the transistors 171', 172' forming the current mirror and the transistor 173' mounted in cascode this time are of the PMOS type.

Figure 7:
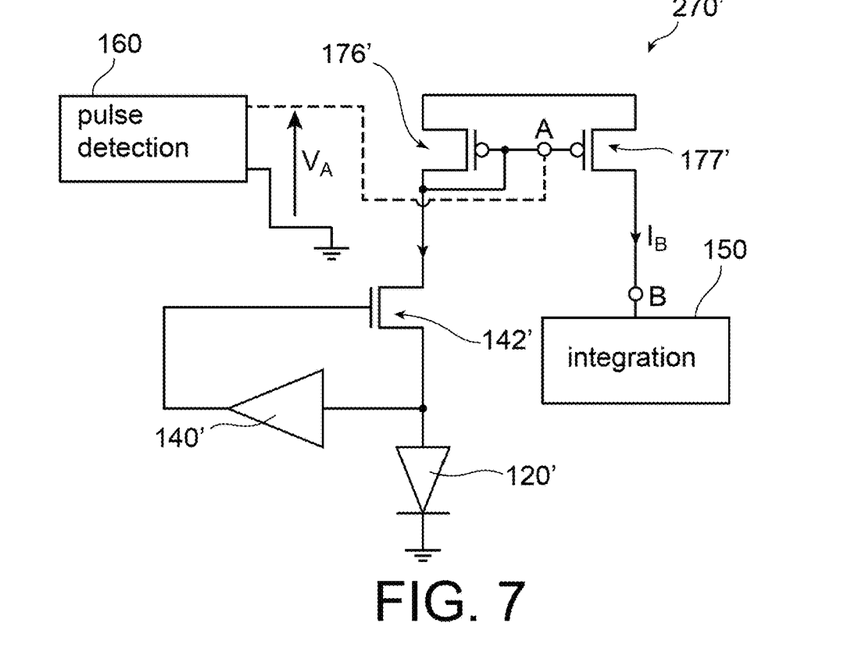
FIG. 7 illustrates an alternative embodiment of the device of FIG. 3 for which the photodiode is of the N-on-P type.

The example of embodiment illustrated in FIG. 7 is a variant of the device of FIG. 3, this time with transistors 176', 177' forming the current mirror of the PMOS type and the direct injection transistor 142' of the NMOS type.

The use of the photodiode 120' of the N-on-P type also adapts to a bias of the direct injection (DI) type as has been described above in connection with FIGS. 4 and 5, this time with transistors forming the current mirror of the PMOS type and the direct injection transistor of the NMOS type.

In one or other of the examples described above, the input node A of the pulse detection stage 160 is arranged on a gate electrode of a transistor of the stage 170.

Thus, this gives an input impedance for the pulse detection stage 160 that depends on the ratio 1/gm, with gm the transconductance of a transistor 173, 177 typically in low inversion operating condition. As this ratio is typically high, a significant gain is thus obtained for the current/voltage conversion.

Figure 8:
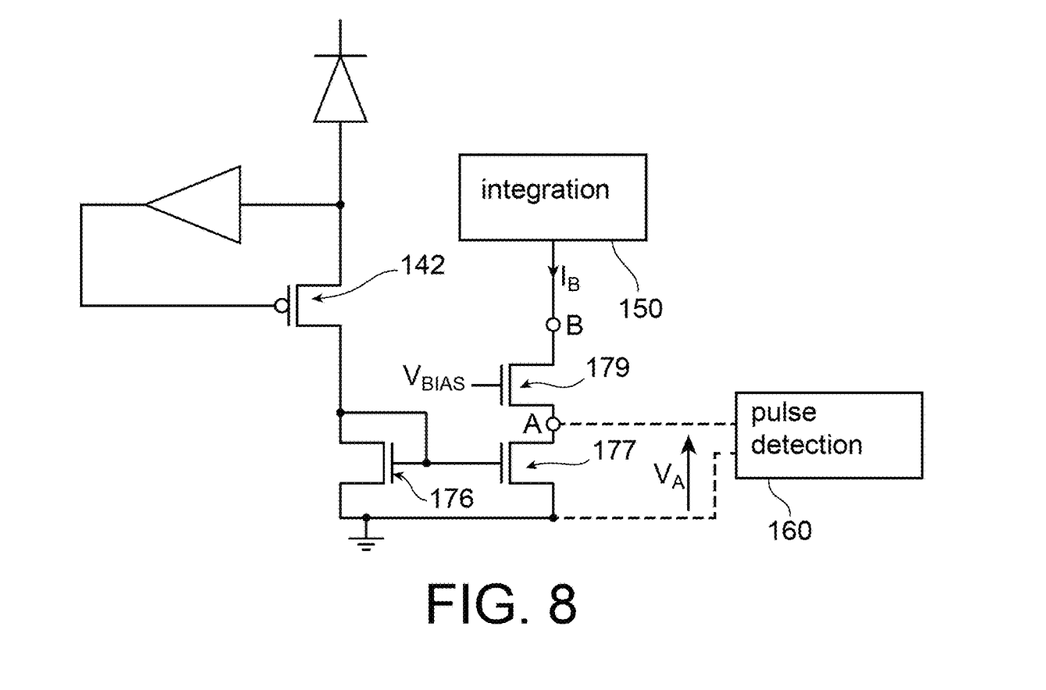
FIG. 8 illustrates an alternative embodiment wherein the input of the pulse detection stage is this time connected to the source of a transistor of the current mirror.

In one alternative embodiment illustrated in FIG. 8, the transistors 176, 177 form a current mirror and the input point A of the pulse detection stage 160 is this time taken on the source of a transistor 179 mounted in cascode and the drain of which is connected to the input of the integration stage 150. This variant preferably adapts to transistors, 176, 177 of the current mirror of identical sizes and then also makes it possible to obtain an important 1/gm gain.

The invention claimed is:

1. An imaging device comprising:
at least one detection element formed of a photodetector associated with and connected to a circuit for reading signals generated by the photodetector,
the circuit being provided with:
an integration stage equipped with an integration capacitor for integrating charges coming from the photodetector,
a pulse detection stage for detecting current pulses produced by the photodetector following receipt of light pulses, and
a bias stage of the photodetector and equipped with a direct injection transistor coupled to the photodetector, and
the circuit further being provided with an intermediate stage arranged between the bias stage and between the integration stage and the pulse detection stage, the intermediate stage being provided with transistors forming a current mirror provided with a branch coupled to a drain of the direct injection transistor and producing on an input branch of the integration stage an image current of a given current delivered by the direct injection transistor, the intermediate stage being configured to convert said given current into a potential on an input node of said pulse detection stage, said input node being arranged on a gate electrode or at a source electrode of a transistor of said intermediate stage.

2. The imaging device according to claim 1, wherein said input node is connected to a drain electrode of the direct injection transistor and to a gate of a transistor of said intermediate stage.

3. The imaging device according to claim 1, wherein the current mirror is formed of:
a first transistor coupled or connected to said electrode of said direct injection transistor, in particular to a drain electrode of said direct injection transistor, and
a second transistor, said second transistor having a gate connected to a gate of the first transistor, said second transistor being coupled or connected to said input branch of the integration stage.

4. The imaging device according to claim 3, wherein said input node of the pulse detection stage is connected to a gate of a third transistor mounted in cascode with said second transistor, said third transistor being directly connected to said input branch of the integration stage.

5. The imaging device according to claim 4, wherein the direct injection transistor, the first transistor, the second transistor, and the third transistor are P-Channel Metal-Oxide-Semiconductor (PMOS) transistors.

6. The imaging device according to claim 3, wherein said input node is connected to the gate of the second transistor and of the first transistor, the first transistor having the gate and a drain connected together, said second transistor being directly coupled or connected to said input branch of the integration stage.

7. The imaging device according to claim 3, wherein the first transistor and the second transistor are N-Channel Metal-Oxide-Semiconductor (NMOS) transistors.

8. The imaging device according to claim 3, wherein an output node of the pulse detection stage is connected to an electrode of said second transistor mounted in cascode with a third transistor, said third transistor being directly connected to said input branch of the integration stage.

9. The imaging device according to claim 3, wherein an output node is connected to an electrode of the first transistor and an electrode of the second transistor, said second transistor being directly coupled or connected to said input branch of the integration stage.

10. The imaging device according to claim 1, wherein the pulse detection stage is equipped with:
   a voltage pulse detection block, configured to detect a voltage threshold and emit a signal indicating exceedance of the voltage threshold when a voltage signal is exceeded; and
   a filtering block upstream of the voltage pulse detection block.

11. The imaging device according to claim 1, wherein the bias stage is a buffered direct injection bias stage and comprises an amplifier, an output of which is connected to a gate of the direct injection transistor.

12. The imaging device according to claim 1, wherein the photodetector operates in an infrared range and wherein said light pulses are from a laser source integrated into the imager device.

* * * * *